Aug. 28, 1956 R. SANDERS 2,760,266
KNIFE BLADES
Filed Dec. 3, 1953 2 Sheets-Sheet 1
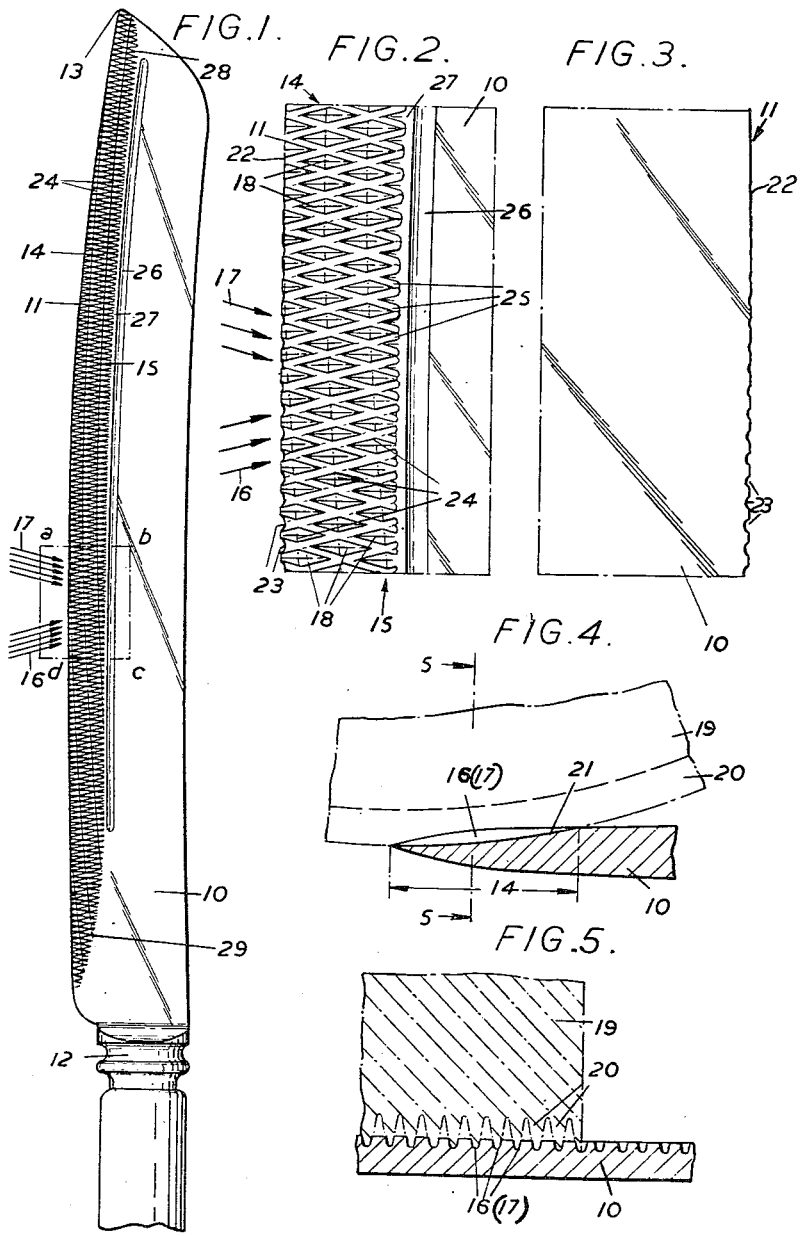
Inventor
RONALD SANDERS
By
Semmes & Semmes
Attorneys Aug. 28, 1956  R. SANDERS  2,760,266
KNIFE BLADES Filed Dec. 3, 1953  2 Sheets-Sheet 2

Inventor
RONALD SANDERS

By
Semmes & Semmes
Attorneys

United States Patent Office 2,760,266
Patented Aug. 28, 1956

2,760,266

KNIFE BLADES

Ronald Sanders, Sheffield, England, assignor to Sanders & Bowers Limited, Sheffield, England Application December 3, 1953, Serial No. 395,977

Claims priority, application Great Britain March 10, 1953

4 Claims. (Cl. 30—357)

This invention relates to knife blades of the type having a series of relatively fine and shallow flutes or grooves extending parallel to each other from the cutting edge of the blade.

Whether or not the grooves in the initial state of the blade break into the actual cutting edge, the series of grooves effects a thinning of the material of the blade over the width of each fine groove immediately adjacent to the cutting edge. This has the initial effect of making the taper to the actual cutting edge alternate in degree at intervals over the grooved length of the blade corresponding to the pitch of the grooves, the sharper taper at each groove alternating with the normal taper of the blade left between the grooves. The cutting power of the blade is thus materially improved, and is maintained when it becomes necessary to sharpen the blade, because renewal of the normal taped when wear has taken place eventually causes the grooves to break definitely into the cutting edge, the thinner material in the grooves sharpening into keener edges than the contiguous normal cutting edges that they interrupt. Notwithstanding this, the total cutting edge is continuous: it may be somewhat sinusoidal; but it is not serrated or saw-like. Consequently, the blade is used with much the same "feel" as an ordinary blade, except that it is much sharper.

The series of grooves forms an attractive pattern, which may end in a definite line more or less parallel to the cutting edge, though possibly tapering at either or both ends of the pattern to the cutting edge. That line may be defined or emphasised by a shallow longitudinal groove, either clear of the inner ends of the series of grooves or having those ends break into it. Because of the shallowness of the grooves and the absence of a saw-like character in the actual cutting edge, the blade may be washed and cleaned much as is a normal blade.

The general object of the invention is to provide a blade possessing the general advantages of improved cutting power and appearance of the type of blade referred to above, but having a keener cutting edge and one that may be readily maintained. A further object is to add to the attractive appearance of this type of blade.

According to the present invention, a knife blade has two series of relatively fine and shallow grooves, with the grooves in each series extending parallel to each other from the cutting edge of the blade, but with the grooves of the two series making different angles with the cutting edge, so that a groove in one series intersects grooves in the other series.

Where the grooves of either series approach the actual cutting edge, the thinning of the material to less than the normal taper of the blade makes the edge keener. Although a groove of one series may approach the edge at the same position as a groove of the other series, in general the grooves of the two series approach the edge at different positions, so that over any short length of the edge the chances are that the major part of that length will be thinned, the grooves of either series removing metal that would lie between the grooves of the other series—metal that does in fact lie between the grooves in the known type of knife with only a single series of grooves.

The spacing of the grooves is of the order of twenty to twenty five to the inch, and the grooves make approximately equal but opposite angles, say about 75°, to the general lengthwise direction of the cutting edge. The pattern of elongated diamonds thus produced has the major axes of the individual diamonds generally normal to the cutting edge.

The invention will now be described in greater detail with reference to the accompanying drawings, in which Figures 1, 6, 7, and 8 are side elevations of knife blades of four different shapes;

Figure 2 is a much enlarged view of the edge portion of the blade contained in the rectangle a—b—c—d of Figure 1;

Figure 3 is a similarly enlarged view of the other side of the edge portion shown in Figure 2;

Figure 4 is a much enlarged cross-section of a blade, showing the method of grinding; and Figure 5 is a section on the line 5—5 of Figure 4.

Figure 6:
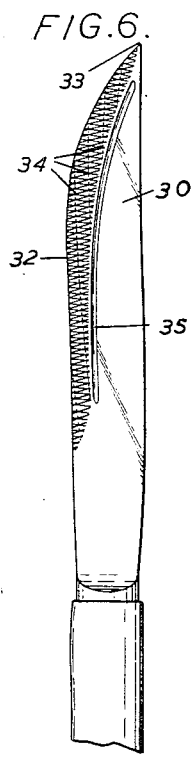

In Figure 1, the blade 10 of a bread knife with its edge 11 slightly but continuously curved from near the bolster 12 to the tip 13 has a band 14 extending from the edge 13 to a depth defined by the line 15 evenly spaced over most of its length from the edge 11, which band contains two series of grooves indicated by the sets of arrows 16, 17 respectively, sloping in opposite directions with respect to the edge 11. Each slope is approximately 75° to the edge 11, but the slopes may vary, and in fact do vary somewhat with respect to the edge, because of the curvature of the edge. Each groove has a rounded bottom and sloping sides (see Figure 5).

Figure 2 shows the general result of applying the two series of grooves, the grooves 16, 17 intersecting each other to form a multiplicity of elongated diamonds 18, with their major axes generally normal to the edge 11. Each diamond 18 is surrounded by metal that has been thinned by the formation of the grooves, and is moreover pyramidal because its four side faces are defined by the oblique sides of the four surrounding grooves.

Each series of grooves is formed by means of a rotating grinding wheel 19 (Figures 4 and 5) with peripheral round-crested ribs 20 in the form of a continuous helix. The ribs are pitched at say 22 or 23 per inch, and the width of the wheel is conveniently 1-inch. The blade 10 is held slightly oblique to the axis of the rotating wheel 19 and is drawn lengthwise to itself across the ribs 20, so that the whole of one series of grooves is cut in continuous manner, the helical ribs "screwing" themselves progressively from grooves already formed to the adjoining un-grooved portion of the band 14. The other series of grooves is then formed by holding the blade 10 with reverse obliquity to the wheel 19 and drawing it across the ribs 20.

As shown at 21 in Figure 4, each groove 16 (or 17) is hollow ground over the width of the band 14, so that the metal of the blade 10 is thinned to less than the normal taper over the width of the bottom of the groove for some distance from the edge 11. If the groove ends precisely at the edge 11, its presence is not seen at the ungrooved side of the blade (22 in Figures 2 and 3), but some of the grooves may break through the edge to varying degree, to produce a slightly sinusoidal notched edge, as at 23.

Any such breaking through to the ungrooved side is slight, and the improver cutting action does not depend on any part of the edge being sinusoidal (and certainly not on the edge being jagged or saw-like), but on the thinning at the edge 11 produced by one or other of the series of grooves 16, 17 or by the coincidence or overlap of the grooves at the edge. Over the length of a curved edge the intersections of the grooves tend to vary in relation to the edge 11 at different positions along that edge.

When the edge is re-sharpened, the new edge is still thinned by the grooves, and is thus very keen, good cutting power being retained as sharpening carries the edge back over a substantial width of the band 14. Re-sharpening causes the new edge 11 to have the major part of its length thinned by the grooves and to contain notches 23.

Between any pair of grooves of one series lies the thicker metal of the diamond pyramids 18, so that the partially hollow ground band 14 remains rigid and provides robust support for the keen cutting edge 11.

Because of the curvature of the edge 11, the diamonds 18 do not align themselves "parallel" to the whole length of the edge, but lie on a number of "parallel" lines 24. Because of the even disposition of the diamonds, their effect in reflecting light is very attractive, and especially because the reflection changes with slight rocking movement of the blade 10. The diamond pattern is easily washed and cleaned.

The line 15 defining the band 14 is really formed by the inner ends 25 (Figure 2) of one or both series of grooves 16, 17, and may be made very even by a skilled operator. A shallow longitudinal groove 26 may be formed "parallel" to the line 15, leaving a plain gap 27. From the ends of the groove 26, the band 14 may taper or curve smoothly from the line 15, as at 28, 29 in Figure 1.

Figure 6 shows a steak or grill knife blade 30 with a band formed by two series of grooves from its edge 32 with a pronounced curve to the tip 33, the band not extending over the whole length of the blade. The curvature causes the lines 34 formed by the diamond pattern to intersect the curved edge at pronounced angles. The band extends to a longitudinal groove 35, which may serve the purpose of eliminating any unevenness of the inner ends of the grooves.

Figure 7:
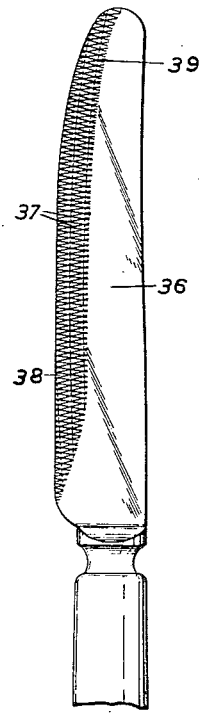

Figure 7 shows the blade 36 of a table knife with the diamond lines 37 parallel to the straight portion of the edge 38, the groove band ending in a line 39 without any longitudinal groove.

Figure 8:
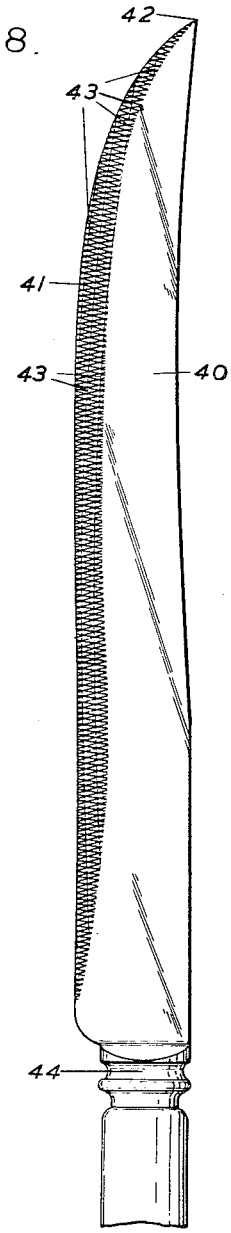

Figure 8 shows the blade of a carving knife 40 with its edge 41 having a pronounced curve to the tip 42. The lines 43 formed by the diamond patterns thus resemble those at 24 in Figure 1 towards the bolster 44 and those at 34 in Figure 6 towards the tip 42.

In general, it is preferable for the two series of grooves to be applied to one side only of the blade, as shown in the figures, but there is not precluded the similar treatment of both sides.

What I claim is:

1. A knife blade formed with a cutting edge from which extend into the material of the blade two series of relatively fine and closely spaced shallow grooves lying in each series parallel to each other but with the grooves of the two series making different angles with the cutting edge, so that a groove in one series intersects grooves in the other series, and along at least part of the blade, the grooves of both series extend to the actual cutting edge.

2. A knife blade formed with a cutting edge from which extend into the material of the blade two series of relatively fine and closely spaced shallow grooves, the grooves of one series intersecting those of the other to form a pattern of enclosed areas of the blade each of rhombic form and having its major diagonal generally normal to the cutting edge.

3. A knife blade formed with a cutting edge from which extend into the material of the blade two series of fine parallel round-bottomed grooves with sloping sides, the grooves of the two series making different angles with the cutting edge and intersecting to form a pattern of enclosed areas of the blade each of rhombic form and having its major diagonal generally normal to the cutting edge, the material of the blade lying within the enclosed areas being frusto-pyramidal in form.

4. A knife blade formed with a cutting edge from which extend into the material of the blade two series of fine parallel round-bottomed grooves with sloping sides, the grooves of the two series intersecting to form and surround a multiplicity of pyramidal frusta of rhombic form having their major diagonals generally normal to the cutting edge.

References Cited in the file of this patent

UNITED STATES PATENTS

| 1,388,547 | Burns | Aug. 23, 1921 |

FOREIGN PATENTS

| 437,076 | Great Britain | Oct. 23, 1935 |
| 608,685 | Great Britain | Sept. 20, 1948 |
| 711,353 | Germany | Oct. 17, 1941 |